(12) United States Patent
Chainer et al.

(10) Patent No.: US 9,830,823 B1
(45) Date of Patent: Nov. 28, 2017

(54) DETECTION OF VEHICLE OPERATION CHARACTERISTICS

(71) Applicant: INTERNATIONAL BUSINESS MACHINES CORPORATION, Armonk, NY (US)

(72) Inventors: Timothy J. Chainer, Putnam Valley, NY (US); Gerard McVicker, Stormville, NY (US); Pritish R. Parida, Fishkill, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/247,863

(22) Filed: Aug. 25, 2016

(51) Int. Cl.
| | |
|---|---|
| *G08G 1/16* | (2006.01) |
| *G06Q 40/08* | (2012.01) |
| *G08G 1/0967* | (2006.01) |
| *H04W 4/04* | (2009.01) |
| *H04L 29/08* | (2006.01) |
| *G08G 1/01* | (2006.01) |

(52) U.S. Cl.
CPC ............ *G08G 1/164* (2013.01); *G06Q 40/08* (2013.01); *G08G 1/096716* (2013.01); *G08G 1/0112* (2013.01); *G08G 1/166* (2013.01); *H04L 67/22* (2013.01); *H04W 4/046* (2013.01)

(58) Field of Classification Search
CPC .......... G08B 1/164; B60Q 1/00; G08G 1/123
USPC .... 340/903, 901, 988, 438; 701/1, 201, 202, 701/206–207, 209
See application file for complete search history.

(56) References Cited

U.S. PATENT DOCUMENTS

| | | | | |
|---|---|---|---|---|
| 7,421,334 | B2 * | 9/2008 | Dahlgren ............... | G07C 5/008 340/989 |
| 2003/0055555 | A1 * | 3/2003 | Knockeart ......... | G01C 21/3415 342/357.31 |
| 2004/0210353 | A1 * | 10/2004 | Rice ...................... | G01C 21/26 701/1 |
| 2004/0236474 | A1 * | 11/2004 | Chowdhary ....... | G06Q 30/0601 701/1 |
| 2009/0051510 | A1 * | 2/2009 | Follmer ................ | G07C 5/008 340/425.5 |
| 2014/0002651 | A1 | 1/2014 | Plante | |
| 2014/0277833 | A1 | 9/2014 | Palan | |
| 2016/0063773 | A1 | 3/2016 | Hatton et al. | |

FOREIGN PATENT DOCUMENTS

WO    2014207558 A2    12/2014

OTHER PUBLICATIONS

List of IBM Patents or Patent Applications Treated as Related to U.S. Appl. No. 15/247,863, filed Aug. 25, 2016.

* cited by examiner

*Primary Examiner* — Tai T Nguyen
(74) *Attorney, Agent, or Firm* — IntelleTek Law Group, PLLC; Gabriel Daniel, Esq.

(57) ABSTRACT

A system for identifying hazardous driving behaviors is presented. Position and motion data from a plurality of vehicles are uploaded to a data center. For each vehicle, the system computes a set of hazard metric for identifying hazardous driving behaviors based on the position and motion information received from the plurality of vehicles. A hazardous vehicle is identified based on the computed hazard metric for the plurality of vehicles. The system reports a set of information regarding the hazardous vehicle to an agency.

22 Claims, 8 Drawing Sheets

DETECTION OF VEHICLE OPERATION CHARACTERISTICS

BACKGROUND

Technical Field

The present disclosure relates to methods and systems for detecting and identifying vehicles engaging in dangerous driving behaviors, specifically, cloud-based detection.

Description of the Related Art

Cloud computing and storage solutions provide users with various capabilities to store and process their data in data centers that may be located far from the user. Cloud computing makes it possible for data collected by multiple different mobile devices to be centrally processed at a data center for the purpose of generating value added information for subscribers.

SUMMARY

A method for detecting and identifying traffic events is presented. In some embodiments, a data center receives position and motion information from a plurality of vehicles. The data center identifies an accident involving first and second vehicles by correlating the motion and position information of the first vehicle with the motion and position information of the second vehicle. The data center accordingly reports the identified accident.

A method for issuing warning regarding hazardous vehicles is presented. In some embodiments, a data center receives position and motion information from a plurality of vehicles. The data center identifies a hazardous vehicle and a set of vehicles that are endangered by the hazardous vehicle based on the received position and motion information. The data center accordingly issues a warning to the identified set of endangered vehicles regarding the hazardous vehicle.

A method for identifying hazardous driving behaviors is presented. Position and motion data from a plurality of vehicles are uploaded to a data center. For each vehicle, the system computes a set of hazard metric for identifying hazardous driving behaviors based on the position and motion information received from the plurality of vehicles. A hazardous vehicle is identified based on the computed hazard metric for the plurality of vehicles. The system reports a set of information regarding the hazardous vehicle to an agency.

The preceding Summary is intended to serve as a brief introduction to some embodiments of the disclosure. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is provided. Moreover, the claimed subject matter is not to be limited by the illustrative details in the Summary, Detailed Description and the Drawings, but rather is to be defined by the appended claims, because the claimed subject matters can be embodied in other specific forms without departing from the spirit of the subject matters.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

Some embodiments of the disclosure provide a Cloud Detection System that receives sensor data from mobile equipment and/or vehicles. The Cloud Detection system monitors and processes the received sensor data to detect events such as collisions or accidents between the vehicles. The event is thus detected and recorded remotely at the Cloud Detection System.

In some embodiments, sensor data from two or more mobile devices equipped with GPS (global positioning system), accelerometer and video sensors are stored in a Cloud Data Center. A processing algorithm identifies a collision between the vehicles by analyzing the spatial information and temporal information that have been uploaded to the cloud datacenter, particularly position and motion information that indicates the two vehicles were at the same place at the same time.

Once the collision event is detected, some embodiments attach additional information to the event, information such as video recording, air bag deployment record, braking record, and speed record that are recorded by the mobile equipment/vehicles involved. In some embodiments, video sensors run in continuous loops and can provide pre-event recording and/or information leading up to the collision. In some embodiments, data from biometric sensors attached to the operators of the mobile equipment/vehicle are also included in the event. In some embodiments, stationary sensors situated in the vicinity of the collision are also monitored to provide additional information on the event.

Figure 1:
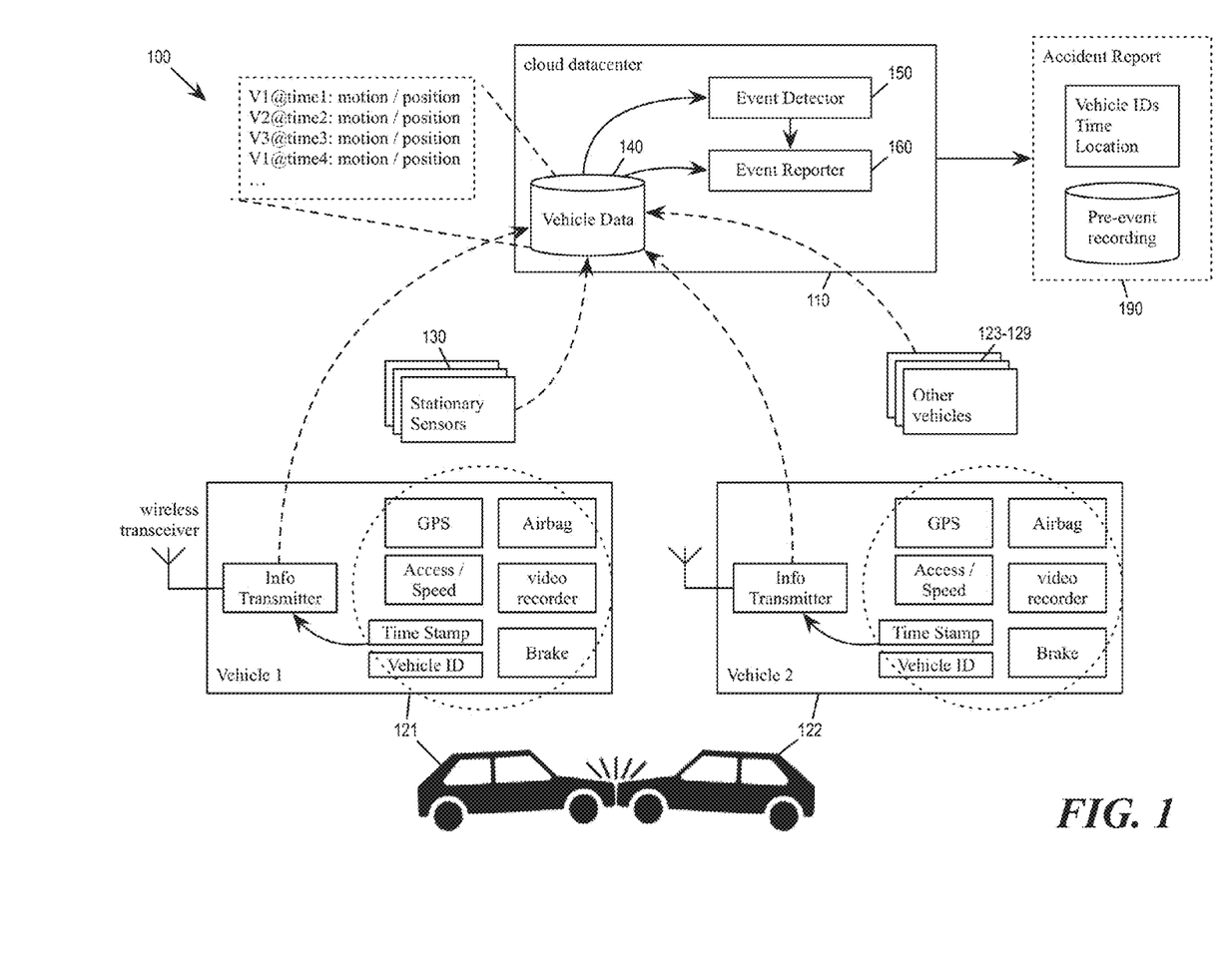
FIG. 1 illustrates a Cloud Detection System that monitors sensor data from mobile equipment/vehicles to detect events such as collision between two or more vehicles.

FIG. 1 illustrates a Cloud Detection System 100 that monitors sensor data from mobile equipment/vehicles in order to detect events such as collisions between two or more vehicles. The system comprises a cloud datacenter 110 that receives sensor data from vehicles 121-129. By analyzing the received sensor data from the vehicles, the cloud datacenter 110 identifies an event and generates a report 190 about the identified event. In the illustrated example, the vehicle 121 and the vehicle 122 have collided at a particular location and a particular time. The cloud detection system 100 uses the sensor data uploaded by the two vehicles 121 and 122 to detect the collision event.

The vehicles 121-129 are mobile units that can move about from one place to another, and can travel to different places at different times. Such a mobile unit can be an automobile, a motorcycle, a pedestrian, or any other moving object or apparatus. In some embodiments, each mobile unit includes or carries equipment or devices that allow the mobile unit or vehicle to become part of the cloud detection system. In some embodiments, the vehicle equipment can include sensors that are physically attached to the vehicle. The vehicle's equipment can also include sensors that are provided by one or more independent mobile devices (such as a smart phone) that are carried aboard the vehicle by its operator/driver (or in the pocket of a pedestrian).

The vehicle's equipment includes sensors for capturing position and motion information regarding the vehicle. The position information is data for identifying the location/position of the vehicle at different moments in time. The motion information is data for describing the motion of the vehicle at different moments in time. As illustrated in FIG. 1, the vehicle 121 includes sensors such as GPS, accelerometer, speedometer, airbag, video recorder, brake, etc. Some embodiments also include sensors that are not illustrated, such as video sensors, tire pressure sensors, etc. In some embodiments, devices physically attached to the vehicle provide some of the sensors, such as GPS, airbag, brake, accelerometer, etc. In some embodiments, independent devices carried aboard the vehicle provide some of the sensors such as GPS, speedometer, and accelerometer. In some embodiments, different vehicles have different types of sensors, and some types of sensors are present in some vehicle but not in others.

In some embodiments, the GPS provides GPS coordinates that can be used to derive position information and/or motion information. In some embodiments, sensors such as video recorder also provide position information that can be used to identify the location of the vehicle. In some embodiments, output from sensors such as accelerometer, speedometer, video recorder, brake sensor, tire pressure is used as motion information of the vehicle. In some embodiments, records of emergency equipment deployment such as airbag deployment are considered as motion information because they are indicative of sudden change in motion (sudden acceleration or deceleration) of the vehicle.

In some embodiments, the vehicle's equipment includes time-stamping mechanisms so each recorded set of position and/or motion information produced by the sensors would be associated with a timestamp. In some embodiments, the vehicle's equipment also includes vehicle identification reporting mechanism so the cloud datacenter would be able to associate the uploaded sensor data with the identity of the vehicle uploading the data.

The vehicle's equipment also includes communications device for communicating with the cloud datacenter 110 such as wireless transceivers in some embodiments. Each vehicle's communications capability allows the vehicle to upload its captured motion and position data to the cloud datacenter 110 through one or more communications mediums. In some embodiments, such communications are conducted wirelessly through wireless communications medium such as WiFi or wireless phone networks. In some embodiments, the data so wirelessly communicated are relayed to the cloud datacenter 110 through networks of wired and/or wireless communications mediums such as Ethernet cables, CATV cables, or fiber optics cables. In some embodiments, some of the communications mediums linking the vehicles 121-129 and the cloud datacenter 110 rely on the Internet, and the motion and position information communicated to the cloud datacenter is conducted through Internet traffic. In some embodiments, each vehicle's communications capability also allows the vehicle to download or receive various data or report, such as those regarding other vehicles or conditions on the road and display them to the operator of the vehicle.

The cloud datacenter 110 is a system that monitors the vehicles 121-129, detects events such as collisions or encounters with road surface defects, and generates reports of the detected events. It receives the upload of the position and motion information from the vehicles 121-129 and analyzes the received information to detect events such as collisions or potential collisions. In some embodiments, the cloud datacenter 110 also receives upload of information from stationary sensors 130 that are not attached to or aboard the vehicles.

In some embodiments, the cloud datacenter 110 is a computing device or a collection of computing devices that are capable of receiving upload data from the vehicles through the Internet or other communications mediums. In some embodiments, such computing device(s) are situated at a data center or an Internet service provider. In some embodiments, such computing devices are provided or maintained by a provider of Internet content (e.g., a traffic information server). In some embodiments, the cloud datacenter is a collection of devices that are situated at different physical locations interconnected by the Internet or the computing cloud to perform the operations of the cloud datacenter.

As illustrated, the cloud datacenter 110 receives uploads of position and motion information (or sensor data) from the vehicles 121-129 (and stationary sensors 130) and stores the uploaded information at a vehicle data storage 140. As illustrated, the storage 140 includes sets of uploaded motion and position information from the different vehicles. Each set of motion and position information is associated with a vehicle identifier for identifying the vehicle that uploaded the set of information. Each set of motion and position information is also associated with a time stamp for identifying the point in time at which the vehicle is having the position and motion described by the set of position and motion information.

Based on the uploaded position and motion information in the storage 140, the cloud datacenter 110 performs event detection (illustrated as an event detector module 150) and event reporting (illustrated as an event reporter module 160) based on the uploaded data at the storage 140. Each detected event causes the cloud datacenter to generate a report such as the report 190, which describes the detected event. Such description in some embodiments include time and location of the event, identities of the vehicles involved in the event, and other information such as video or photographs of the event (which may be uploaded from the vehicles). The content of the report is then provided to subscribers (such as the vehicles 121-129) to provide traffic information, warnings of road hazard, and other types of notifications.

In some embodiments, the event detector 150 of the cloud datacenter 110 identifies events by monitoring and analyzing the uploaded position and motion information, specifically by correlating uploaded position and motion information of one vehicle with other vehicles. In some embodiments, the cloud datacenter receives position and motion information from the vehicles and identifies an incident involving two of the vehicles by correlating the motion and position information of one vehicle with the motion and position information of another vehicle. The cloud datacenter 110 then reports the identified incident to e.g., subscribers, emergency services, etc.

Figure 2:
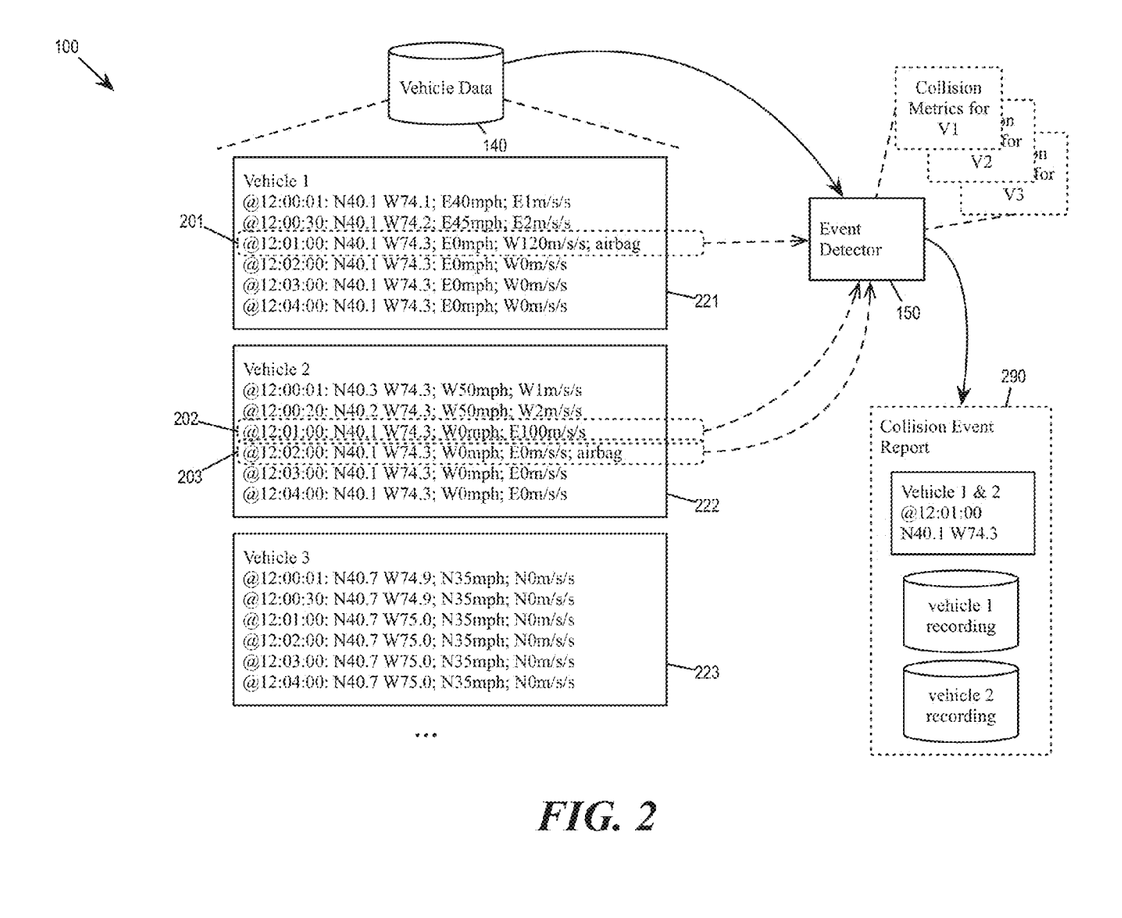
FIG. 2 conceptually illustrates the detection of a collision event by examining the position and motion data uploaded by the vehicles.

For some embodiments, FIG. 2 conceptually illustrates the detection of a collision event by examining the position and motion data uploaded by the vehicles. As illustrated, the vehicle data storage 140 of the cloud datacenter 100 stores position and motion information for vehicles 121-129. Specifically, FIG. 2 shows portions of the position and motion information for vehicles 121, 122 and 123 (illustrated as position and motion histories 221, 222, and 223; position and motion information of vehicles 124-129 are not illustrated for simplicity). For each vehicle, the position and motion information (including GPS position, speed, acceleration, airbag deployment, etc.) at various time instants are recorded. The event detector 150 of the cloud datacenter 110 in turn uses the position and motion information of the vehicles to detect collision events.

As illustrated, the position/motion history 221 shows that the vehicle 121 at time 12:01:00 is at position "N40.1 W74.3" having speed of 0 mph with airbag deployed (at entry 201). The position/motion history 222 shows that the vehicle 122 at time 12:02:00 is also at position "N40.1 W74.3" having speed of 0 mph with airbag deployed (at entry 203). The event detector 150 in some embodiments therefore correlates the position/motion histories 221 and 222 and determined that a collision event has occurred between these two vehicles (121 and 122) at position "N40.1 W74.3" and at time 12:02:00.

Different embodiments use different techniques to detect collision events based on the uploaded position and motion data. Some embodiments compute a collision metric for each vehicle based on the received position and motion information. In some embodiments, the collision metric of a vehicle is based on a heading, speed, and acceleration data of a vehicle that are gleaned or computed from information uploaded by the vehicle. The collision metric of some embodiments is also based on emergency equipment deployment record, such as that of an airbag. In some of these embodiments, the cloud datacenter identifies or detects a collision incident by identifying a location and a time at which two or more vehicles having collision metrics exceeding a threshold. Some embodiments compute the collision metric of a vehicle based on its spatial and temporal relationship with other vehicles, such as the vehicle's speed and position relative to other vehicles (that are derived from the uploaded position and motion information). Some of these embodiments compute the collision metric as a probability of collision based on the relative speed and position, where the cloud datacenter detects collision by examining whether the collision metric has exceeded a threshold probability of collision.

In the example of FIG. 2, the event detector 150 is computing collision metrics for vehicles 121-123 (and others not illustrated), which are used to detect collision events. For example, as mentioned, airbag deployment record is used as "motion information" for computing the collision metric of a vehicle in some embodiments. In some embodiments the deployment of an airbag is weighed heavily in the computation of collision metric. Since both vehicle 1 and vehicle 2 have their airbags deployed at the same place and at the same time according to entries 201 and 203 (at time 12:02:00 and position "N40.1 W74.3"), their collision metrics would exceed a detection threshold at the same place and time. The event detector 150 therefore determines that a collision event has occurred between those two vehicles.

Some embodiments define at the same place and time as being "close enough," i.e., having spatial and temporal differences that are within a threshold.

As mentioned, not all vehicles in the cloud detection system are equipped with the same set of sensors, and some vehicles may not be equipped to report the deployment of airbags or other emergency equipment. Some embodiments therefore rely on relative distance and speed between the vehicles to detect a collision event. In some of these embodiments, the event detector computes collision metrics for each vehicle based on the vehicle's relative speed and position with other vehicles. In the example of FIG. 2, the event detector 150 computes collision metrics of vehicle 1 based on its relative distance and speed with vehicle 2 and other vehicles and determines that at time 12:02:00, the collision metrics of both vehicles has exceeded a threshold and that a collision has likely occurred. For example, according to history 221 and 222, the relative distance of the vehicles is extremely close (e.g., within a threshold distance) around the time 12:01:00, while both vehicles are experiencing significant deceleration (vehicle 1 reporting significant westward acceleration while heading eastward and vehicle 2 reporting significant eastward acceleration while heading westward). The relative close distance between the two vehicles based on the uploaded position data and the sudden acceleration in the opposite direction based on the uploaded motion data results in a collision metric for both vehicles 1 and 2 to rise near or above the collision detection threshold value.

In some embodiments, other sensor readings that are uploaded to the cloud datacenter are also factored into the computation of collision metric, such as airbag deployment, tire pressure, video record, etc. For example, it is possible that the received speed/position/acceleration data failed to capture a particular collision event, but the existence of other sensor data or motion information would nevertheless cause the collision metric to exceed the threshold value and allow detection of the accident (e.g., airbag deployment, sudden change of tire pressure of two vehicles near the same place and time, etc.) In some embodiments, the event detector also uses information uploaded by other sources to confirm an accident, sources such as other vehicles or stationary sources in the vicinity of the event.

Upon the event detector 150 having determined that a collision has occurred based on the computed collision metrics, the event detector 150 produces a collision event report 290. As illustrated, the collision event report 290 identifies the vehicles that are involved in the accident (vehicles 1 and 2) as well as the time and place of the accident (at time 12:02:00 and position "N40.1 W74.3"). In some embodiments, such report or the information regarding the detected collision is provided to other vehicles and/or other agencies. In some embodiments, a collision report also includes video recordings prior to the event. Some embodiments receive such video recording from the vehicles involved in the accident, or other vehicles or stationary sources that are near the scene of the accident. Some embodiments identify other vehicles and stationary sources near the scene of the collision based on the position information recorded in the vehicle data storage 140. In some embodiments, such recordings include a recording of an interval of time before and after the detected collision event.

Figure 3:
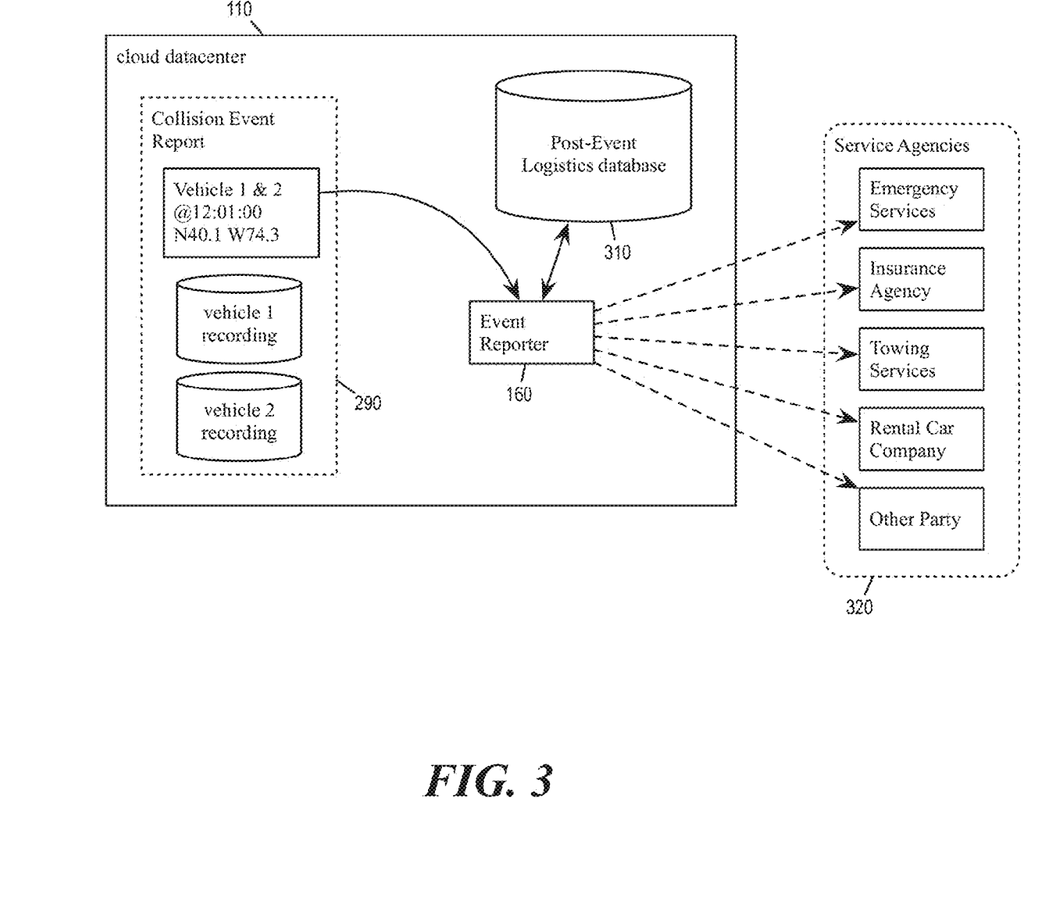
FIG. 3 illustrates the notification of services and agencies based on a detected collision event.

Some embodiments use the information in the collision report (e.g., 290) to notify relevant services and agencies. In some embodiments, such notification is based on a location of the detected collision event and/or the identity of the vehicles involved in the collision that is embedded in the collision report. FIG. 3 illustrates the notification of services and agencies based on a detected collision event.

As illustrated, the generated report 290 for the identified collision is forwarded to the event reporter 160 of the cloud datacenter 110. The event reporter 160 in turn notifies various service agencies 320 such as emergency services, insurance agencies, towing services, and substitute transportations (such as rental car, taxi, etc.) Some of these services are identified based on the location of the identified collision event, such as emergency services, towing services, auto repair shops, or taxi services. Some of these services are identified based on the identities of the vehicles involved in the collision, such as insurance agencies and rental car companies.

Some of these services are identified based on the intended destination of the vehicle. The intended destination of the vehicle is available to the cloud datacenter if the vehicle involved in the collision was running a navigation application and have uploaded the intended destination to the cloud datacenter. The intended destination can also be based on the work address or home address of the user of the vehicle. The cloud datacenter 110 may select a provider of the substitute transportation based on the intended destination and relay the intended destination information to the provider of the substitute transportation.

In some embodiments, the event detector 150 provides an estimate of the severity of the detected collision in the report. The cloud datacenter 110 uses the estimated severity to determine what types of agencies and services to contact. For example, the cloud datacenter 110 can determine whether to call an ambulance or the police based on the identified severity.

In some embodiments, the cloud datacenter 110 includes a post-event logistics database 310, which indexes service agencies according to vehicle identities and/or locations and/or intended destination and/or severity of the accident. The cloud datacenter 110 uses the logistical information stored in the post-event logistics database 310 to look up the service agencies that it should contact or deploy for the identified accident. In some embodiments, the cloud datacenter 110 receives logistical information from individual vehicles and then populates the post-event logistics database accordingly. Insurance companies may also populate the logistical database 310 with logistical information for the vehicles that they insure.

The cloud data center 110 uses the content of the post-event logistics database to deploy services for individuals involved in the accident. For example, the cloud center 110 may contact a ride service to take the persons involved in the accident to the nearest user preferred car rental company, or contact a towing service to tow the damaged vehicle to a user preferred auto repair shop. The user preferences are provided by the post-event logistics database.

The cloud center may also contact tow-truck to tow the vehicles to the nearest user-preferred auto-shop. Such user preferences are available to the cloud data center as part of the post-event logistics database 310. The cloud data center may also forward a report to the all parties of the collision (or at least those that are participant of the cloud detection system 100). Such report in some embodiments include information about the accident itself (location, time), the identity of vehicles involved, as well as other information such as insurance information that are provided by the post-event logistics database 310.

In some embodiments, in addition to detecting events such as collisions based on uploaded position and motion information, the cloud detection system also provides warnings to subscribers based on analysis of the position and motion information. In some embodiments, the cloud detection system uses the uploaded motion and position data to identify a hazard vehicle as well as vehicles that are endangered by the identified hazard vehicle. The system then issues warnings to the identified endangered vehicles regarding the hazardous vehicle. In addition to issuing warnings to the identified endangered vehicles, the cloud detection system can also make information regarding the identified hazard vehicles available to interested parties such as law enforcement agencies or insurance companies (e.g., the insurance companies associated with the identified hazard vehicles.)

In some embodiments, the cloud datacenter identifies hazardous vehicles by computing a hazard metric for each of the plurality of vehicles based on the received position and motion information. A vehicle having a hazard metric that is above a threshold is identified as a hazard vehicle. In some embodiments, the hazard metric of a vehicle is computed based on a speed of the vehicle and a condition of the road that the vehicle is traveling on. In some embodiments, the hazard metric of a vehicle is computed based on a history of the motion information of the vehicle over an interval of time.

Figure 4:
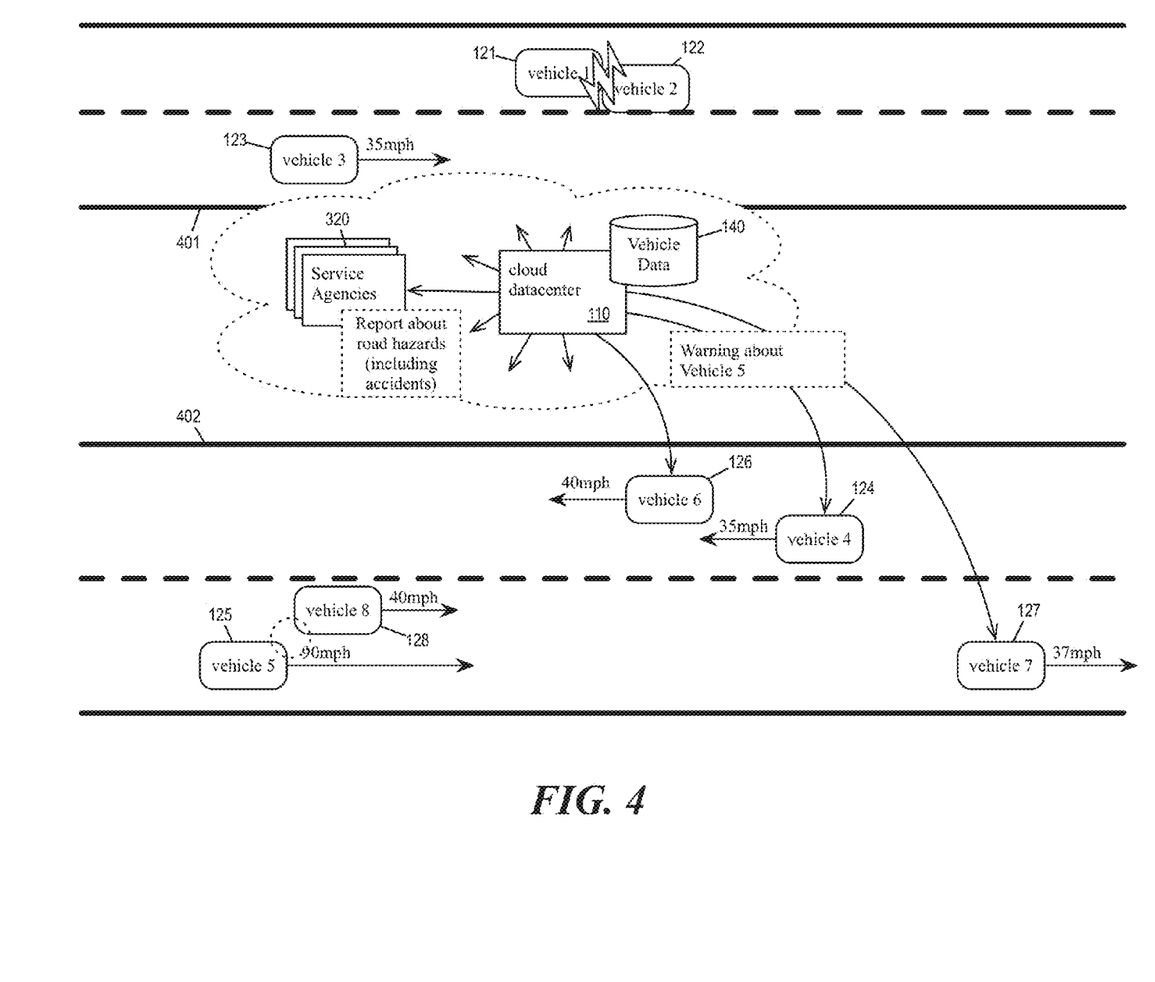
FIG. 4 conceptually illustrates the cloud detection system detecting hazard vehicles and issuing warnings to endangered vehicles.

FIG. 4 conceptually illustrates the cloud detection system detecting hazard vehicles and issuing warnings to endangered vehicles. FIG. 4 illustrates vehicles on two different roads. Vehicles 121-123 (labeled as vehicles 1, 2, and 3) are traveling in road 401 and vehicles 124-128 (labeled as vehicles 4, 5, 6, 7, and 8) are traveling on road 402. At least some of the vehicles illustrated are configured to upload position and motion information to the cloud datacenter 110, accordingly. The cloud datacenter 110 has already detected that vehicles 121 and 122 are involved in a collision by analyzing the uploaded data.

Based on the uploaded data, the cloud datacenter 110 has also determined that one of the vehicles (vehicle 125) traveling on the road 402 is a hazard to other vehicles (e.g., for being too fast or engaging in other dangerous driving behaviors). The cloud datacenter identifies the vehicle 125 as being a hazard vehicle based on the motion and position data uploaded by the vehicle 125. The cloud datacenter can also identify the vehicle as being a hazard vehicle based on motion and position data uploaded by other vehicles such as the vehicle 128, which had recorded unsafe relative distance and speed with respect to the vehicle 125.

The cloud datacenter 110 identifies vehicles 124, 126, and 127 as vehicles that are endangered by the hazard vehicle, again according to the uploaded position and motion data. The cloud datacenter therefore issues warnings to vehicles 124, 126, and 127 about the hazard posed by vehicle 125. Since vehicles 121-123 are traveling on a different road (401), they are not identified as being endangered, so the cloud datacenter does not issue warnings about the vehicle 125 to those vehicles (i.e., 121-123). In addition to issuing warnings to the endangered vehicles, the cloud datacenter also reports information regarding hazard vehicle 125 to insurance agencies and/or law enforcement agencies (among service agencies 320).

In some embodiments, endangered vehicles are identified by identifying vehicles that are positioned within a threshold distance of the hazardous vehicle, the threshold distance being determined by (i.e., a function of) the speed of the hazardous vehicle and the condition of the road that the vehicles are traveling on. Some embodiments identify endangered vehicles by computing a projected path of the hazardous vehicle and identifying vehicles that are likely to be in the projected path of the hazardous vehicle.

In the example illustrated by FIG. 4, the cloud datacenter 110 computes hazard metrics for vehicles 121-127 from the data stored in the vehicle data storage 140. Based on the computed hazard metrics, the cloud datacenter 110 has determined that the vehicle 215 is a hazard vehicle because its hazard metric has exceeded threshold. This hazard metric can be computed based on the speed (e.g., 90 mph) and the condition of the road 402. The hazard metric can also be computed based on other factors, such as the vehicle's history of acceleration (e.g., erratic acceleration pattern) or even the driver's prior record. In some embodiments, the hazard metric is computed based on speed, distance traveled, average distance maintained between vehicles. The computation of hazard metric may also rely on recordings from video cameras on board vehicles or proximity sensors. These metrics could be recorded by the on-board electronic in each vehicle or through other new sensors and communicated to the cloud datacenter 110.

The cloud datacenter 110 computes hazard metric for detecting several different types unsafe driving behaviors, such as tail-gaiting (e.g., following another vehicle too closely for too long period of time), cutting-off (e.g., abrupt lane change right in front of other vehicles), and intentional obstruction of other vehicles (e.g., speeding when someone is trying to pass, abrupt acceleration or slowing down so that no one can pass, etc.). To detect these unsafe driving behaviors, the cloud datacenter 110 may for example, use video recording or proximity sensor data of other vehicles (e.g., the vehicle 128) to determine if a vehicle has executed a dangerous maneuver that is too fast or abrupt based on its relative speed and distance from other vehicles. For example, to detect tail gating, the datacenter uses the uploaded the motion and position information from the vehicles to determine whether any vehicle is closer than a threshold distance at a speed over a threshold speed to another vehicle for over a threshold period of time.

With the vehicle 125 identified as being a hazard vehicle, the cloud datacenter 110 identifies vehicles that are endangered by the vehicles 125, namely vehicles 124, 126, and 127 in the example of FIG. 4. The cloud datacenter 110 identify these vehicles as being endangered because of their proximity to the vehicle 125 (e.g., within a distance that is too close considering the speed of the hazard vehicle). The cloud datacenter 110 identify these vehicles as being endangered because they are computed as being in the likely path of the hazard vehicle. In this case, the cloud datacenter 110 recognizes from the uploaded data that the vehicles 124, 126 and 127 are in the same road as the hazard vehicle 125 and, therefore, endangered. The cloud datacenter 110 also recognizes that the endangered vehicles 124, 126 and 127 are to the east of the hazard vehicle 125, which is its direction of travel.

Figure 5:
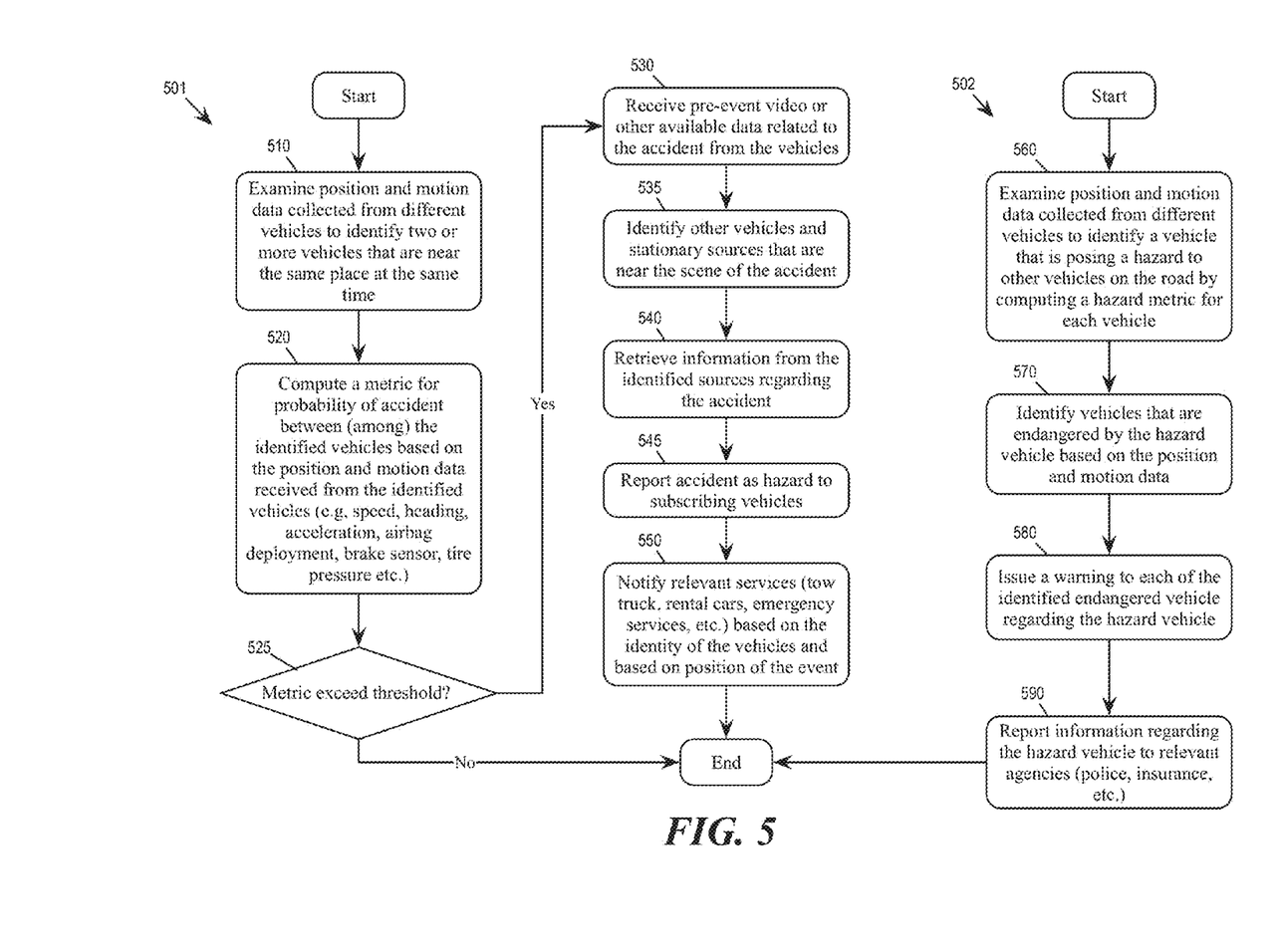
FIG. 5 conceptually illustrates processes for detecting and reporting a collision event, identifying hazard vehicles, and issuing warnings to endangered vehicles.

FIG. 5 conceptually illustrates two processes 501 and 502 performed by the cloud detection system, specifically at the cloud datacenter 110. The process 501 is for detecting and reporting collision event, while the process 502 is for identifying hazard vehicles and issuing warnings to endangered vehicles. In some embodiments, the cloud datacenter operates both processes 501 and 502 at the same time. In some embodiments, the cloud datacenter has several processing units or computing devices that simultaneously execute several instances of the processes 501 and 502.

The process 501 starts by examining (at 510) position and motion information collected from different vehicles to identify two or more vehicles that are near the same place at about the same time. The process computes (at 520) a metric for the probability of collision event/accident between the two or more identified vehicles based on the position and motion data received from those vehicles. In some embodiments, the process computes the collision metric based the relative speed and position of the vehicles (computed from position, speed, heading, and acceleration of the vehicles). The process may also compute the collision metric based on other upload information such as airbag deployment record, brake sensor, tire pressure, etc.

The process 501 determines (at 525) whether the computed collision metric exceed threshold. If so, a collision event has been detected and the process proceeds to 530. If the computed collision metric does not exceed threshold, the process 501 ends. The detection of collision event is described by reference to FIG. 2 above.

At 530, the process receives pre-event video or other available information related to the detected collision event from the vehicles involved in the identified event. The process also uses (at 535) the location of the detected collision event to identify other vehicles or stationary sources that are near the scene of the accident. The process retrieves (at 540) relevant recording or sensor information from these other identified sources.

The process reports (at 545) the site of the accident as a hazard to vehicles that are participant or subscribers of the cloud detection system. The process also notifies (at 550) relevant services and agencies based on the identity of the vehicles involved in the collision event and based on the location of the event. The identification and notification of service agencies upon a detection of a collision is described above by reference to FIG. 3. The process 501 then ends.

The process 502 starts by examining (at 560) position and motion data collected from different vehicles to identify a vehicle (the hazard vehicle) that poses a hazard to other vehicles on the road by computing a hazard metric for each vehicle. Once a vehicle has been identified as a hazard vehicle, the process identifies (at 570) other vehicles that are endangered by the hazard vehicle based on the uploaded position and motion data. The process issues (at 580) a warning to each of the identified endangered vehicles. The process also reports (at 590) information regarding the hazard vehicle to agencies such as law enforcement or insurance agencies. The identification of hazard vehicles and issuance of warning regarding hazard vehicles are described by reference to FIG. 4 above. The process 502 then ends.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
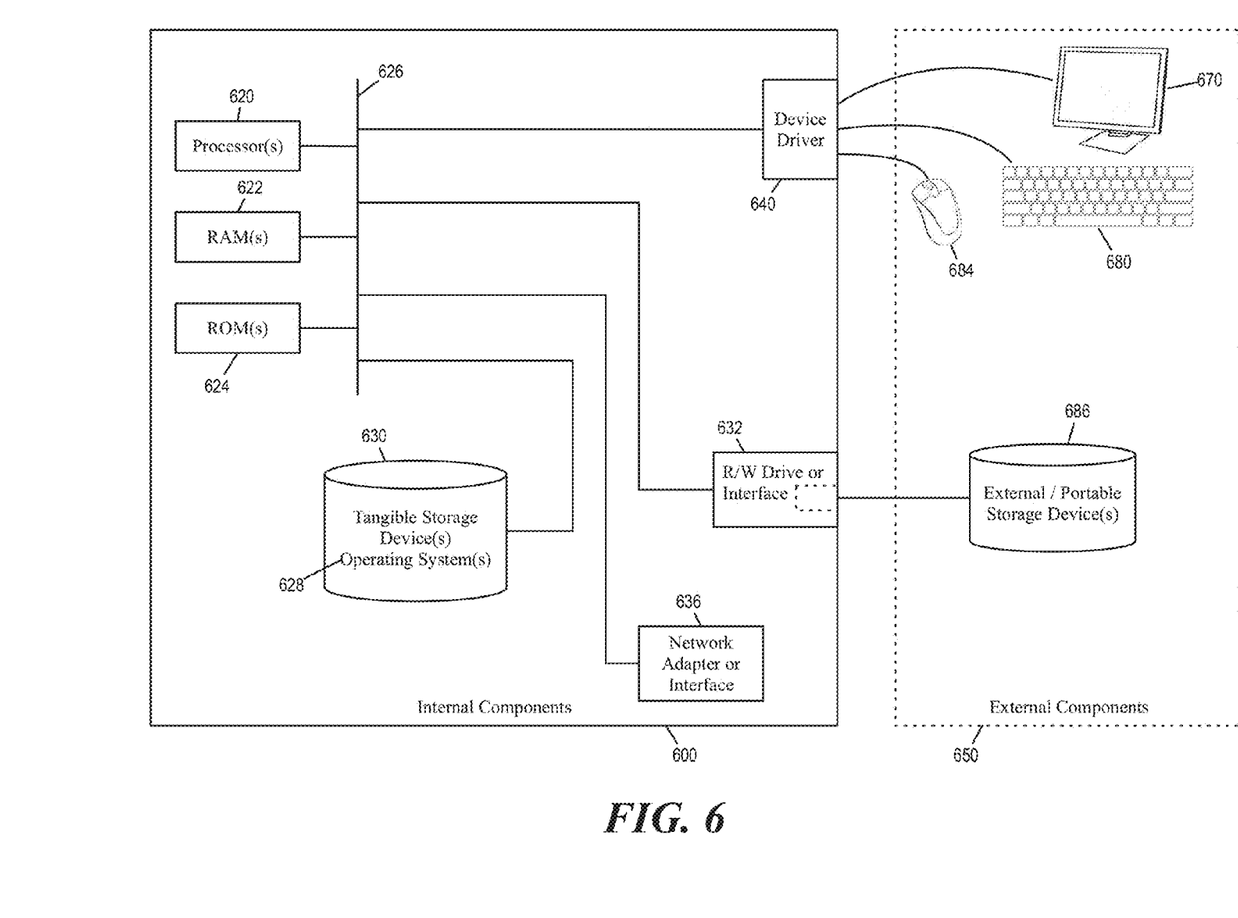
FIG. 6 shows a block diagram of the components of a data processing system in accordance with an illustrative embodiment of the present disclosure.

FIG. 6 shows a block diagram of the components of a data processing system 600 and 650 that may be included within cloud datacenter 110 of the cloud detection system in accordance with an illustrative embodiment of the present disclosure. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 600, 650 is representative of any electronic device capable of executing machine-readable program instructions. Data processing system 600, 650 may be representative of a smart phone, a computer system, PDA, or other electronic devices. Examples of computing systems, environments, and/or configurations that may be represented by data processing system 600, 650 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The data processing system 600, 650 may include a set of internal components 600 and a set of external components 650 illustrated in FIG. 6. The set of internal components 600 includes one or more processors 620, one or more computer-readable RAMs 622, one or more computer-readable ROMs 624 on one or more buses 626, one or more operating systems 628, and one or more computer-readable tangible storage devices 630. The one or more operating systems 628 and programs, such as the programs for executing the processes 501 and 502, are stored on one or more computer-readable tangible storage devices 630 for execution by one or more processors 620 via one or more RAMs 622 (which typically include cache memory). In the embodiment illustrated in FIG. 6, each of the computer-readable tangible storage devices 630 is a magnetic disk storage device of an internal hard drive. Alternatively, each of the computer-readable tangible storage devices 630 is a semiconductor storage device such as ROM 624, EPROM, flash memory or any other computer-readable tangible storage device that can store a computer program and digital information.

The set of internal components 600 also includes a R/W drive or interface 632 to read from and write to one or more portable computer-readable tangible storage devices 686 such as a CD-ROM, DVD, memory stick, magnetic tape, magnetic disk, optical disk or semiconductor storage device. The instructions for executing the processes 501 and 502 can be stored on one or more of the respective portable computer-readable tangible storage devices 686, read via the respective R/W drive or interface 632 and loaded into the respective hard drive 630.

The set of internal components 600 may also include network adapters (or switch port cards) or interfaces 636 such as a TCP/IP adapter cards, wireless Wi-Fi interface cards, or 3G or 4G wireless interface cards or other wired or wireless communication links. Instructions of processes or programs described above can be downloaded from an external computer (e.g., server) via a network (for example, the Internet, a local area network or other, wide area network) and respective network adapters or interfaces 636. From the network adapters (or switch port adaptors) or interfaces 636, the instructions and data of the described programs or processes are loaded into the respective hard drive 630. The network may comprise copper wires, optical fibers, wireless transmission, routers, firewalls, switches, gateway computers and/or edge servers.

The set of external components 650 can include a computer display monitor 670, a keyboard 680, and a computer mouse 684. The set of external components 650 can also include touch screens, virtual keyboards, touch pads, pointing devices, and other human interface devices. The set of internal components 600 also includes device drivers 640 to interface to computer display monitor 670, keyboard 680 and computer mouse 684. The device drivers 640, R/W drive or interface 632 and network adapter or interface 636 comprise hardware and software (stored in storage device 630 and/or ROM 624).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
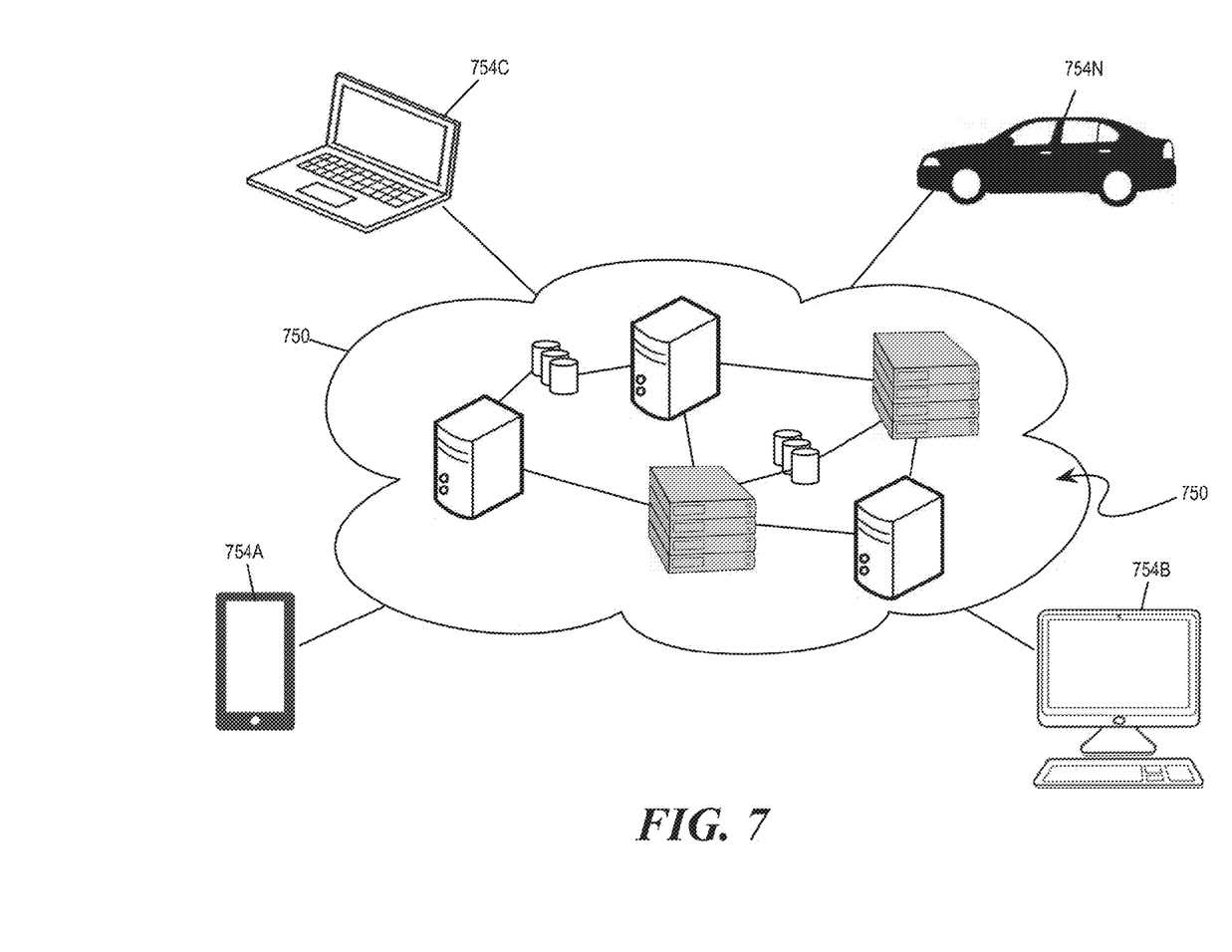
FIG. 7 illustrates a cloud computing environment.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
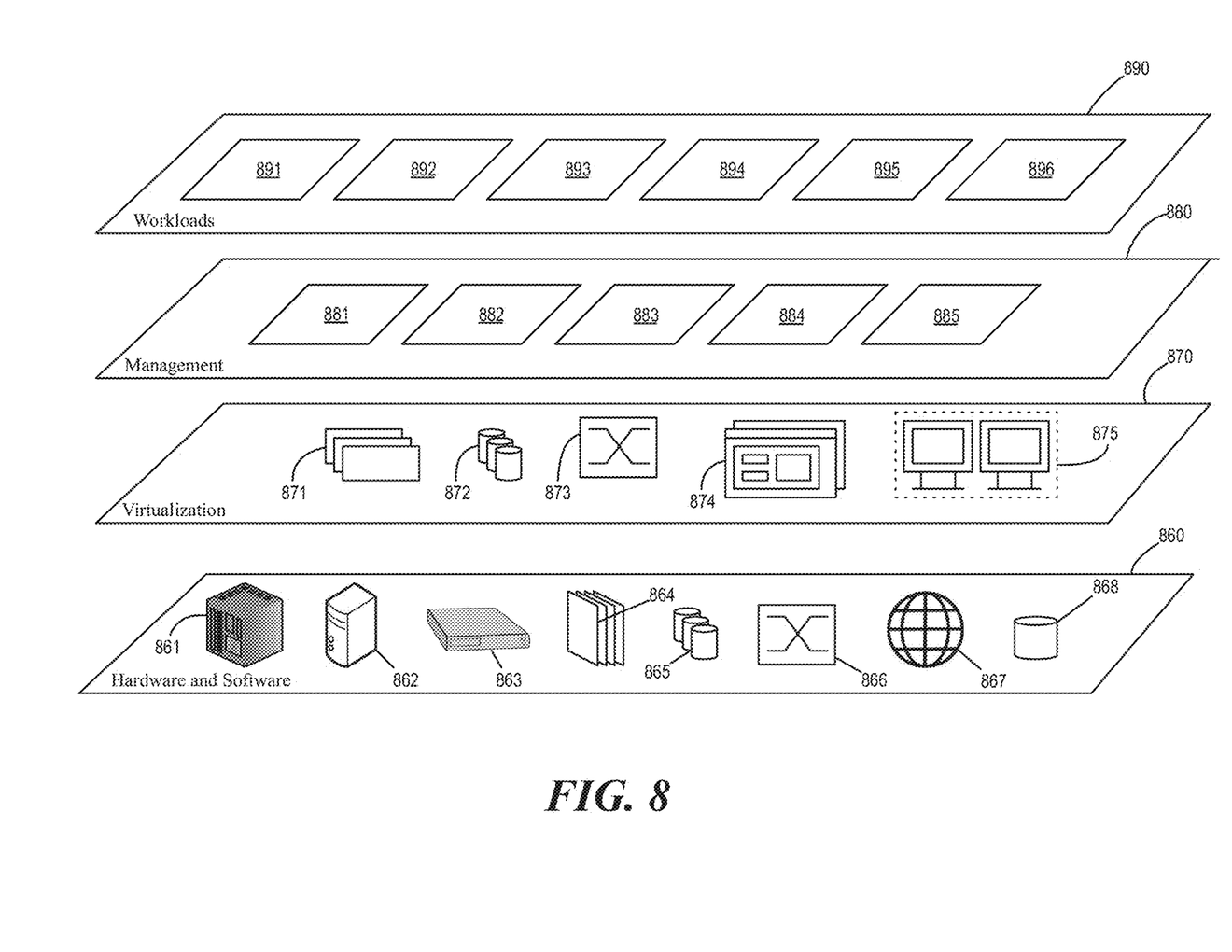
FIG. 8 illustrates a set of functional abstraction layers provided by a cloud computing environment.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and traffic event detection and reporting 896. In some embodiments, the traffic event detection and reporting workload 896 performs the function of the event detector 150 and the event reporter 160 of the cloud detection system 100 as described above.

The foregoing one or more embodiments facilitate the detection of traffic event and/or unsafe driving behavior within a computer infrastructure by having one or more computing devices receiving sensor data or motion and position information from many vehicles. The computer infrastructure is then used to analyze the received information to detect traffic event and/or unsafe driving behavior by vehicles on the road.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   receiving, by a remote data center computing device, from a plurality of vehicles, corresponding position and motion information of the plurality of vehicles;
   for each vehicle of the plurality of vehicles, computing hazard metrics for identifying hazardous driving behaviors based on the position and motion information received from the plurality of vehicles;
   identifying a hazardous vehicle based on the computed hazard metrics for the plurality of vehicles;
   reporting a set of information regarding the hazardous vehicle to an agency;
   identifying one or more vehicles from the plurality of vehicles as being endangered by the hazardous vehicle, based on the received position and motion information of each of the plurality of vehicles; and
   issuing a warning to the identified one or more endangered vehicles.

2. The method of claim 1, wherein the hazard metrics of a vehicle are computed based on its relative speed and distance from other vehicles.

3. The method of claim 1, wherein computing the hazard metrics of a vehicle comprise determining, based on the motion and position information received from the plurality of vehicles, whether the vehicle is closer than a threshold distance to another vehicle for over a threshold period of time.

4. The method of claim 1, wherein the hazard metrics for a vehicle comprises a metric for detecting tail-gating based on the motion and position information received from the plurality of vehicles.

5. The method of claim 1, wherein the hazard metrics for a vehicle comprises a metric for detecting an abrupt lane change based on the motion and position information received from the plurality of vehicles.

6. The method of claim 1, wherein the agency is an insurance company associated with the identified hazard vehicle.

7. The method of claim 1, wherein the hazard metrics of a vehicle are based on a speed of the vehicle and a condition of the road that the vehicle is traveling on.

8. The method of claim 1, wherein the hazard metrics of a vehicle are based on a history of the motion information of the vehicle over an interval of time.

9. A remote data center computing device comprising:
a set of processing units; and
a computer readable storage medium storing sets of instructions, wherein an execution of the sets of instructions by the processor configures the processor to perform acts comprising:
for each vehicle of a plurality of vehicles, computing hazard metrics for identifying hazardous driving behaviors based on a position and motion information received from the vehicle;
identifying a hazardous vehicle based on the computed hazard metrics for the plurality of vehicles;
reporting a set of information regarding the hazardous vehicle to an agency;
identifying one or more vehicles from the plurality of vehicles as being endangered by the hazardous vehicle, based on the received position and motion information of each of the plurality of vehicles; and
issuing a warning to the identified one or more endangered vehicles.

10. The computing device of claim 9, wherein the hazard metrics of a vehicle are computed based on its relative speed and distance from other vehicles.

11. The computing device of claim 9, wherein computing the hazard metrics of a vehicle comprises determining, based on the motion and position information received from the plurality of vehicles, whether the vehicle is closer than a threshold distance to another vehicle for over a threshold period of time.

12. The computing device of claim 9, wherein the hazard metrics for a vehicle comprise a metric for detecting tail-gating based on the motion and position information received from the plurality of vehicles.

13. The computing device of claim 9, wherein the hazard metrics for a vehicle comprise a metric for detecting abrupt lane-changing based on the motion and position information received from the plurality of vehicles.

14. The computing device of claim 9, wherein the agency is an insurance company associated with the identified hazard vehicle.

15. The computing device of claim 9, wherein the hazard metrics of a vehicle are based on a speed of the vehicle and a condition of the road that the vehicle is traveling on.

16. The computing device of claim 9, wherein the hazard metrics of a vehicle are based on a history of the motion information of the vehicle over an interval of time.

17. A method comprising:
receiving, by a remote data center computing device, from a plurality of vehicles, corresponding position and motion information of the plurality of vehicles;
identifying a hazardous vehicle based on the received position and motion information;
identifying a set of vehicles that are endangered by the hazardous vehicle based on the received position and motion information; and
issuing a warning to the identified set of endangered vehicles regarding the hazardous vehicle.

18. The method of claim 17, wherein identifying the hazardous vehicle comprises:
computing, by a remote data center computing device, a hazard metric for each of the plurality of vehicles based on the received position and motion information; and
identifying a vehicle having a hazard metric that is above a threshold.

19. The method of claim 17, wherein identifying the set of endangered vehicles comprises identifying vehicles that are positioned within a distance of the hazardous vehicle.

20. The method of claim 17, wherein identifying the set of endangered vehicles comprises computing a projected path of the hazardous vehicle and identifying vehicles that are likely to be in the projected path of the hazardous vehicle.

21. The method of claim 17, wherein the hazard metric of a vehicle is based on a speed of the vehicle and a condition of the road that the vehicle is traveling on.

22. The method of claim 17, wherein the hazard metric of a vehicle is based on a history of the motion information of the vehicle over an interval of time.

* * * * *